F. R. INNES.
CURRENT JACK FOR ELECTRICAL METERS.
APPLICATION FILED SEPT. 18, 1915.
1,240,574.
Patented Sept. 18, 1917.
3 SHEETS—SHEET 1.
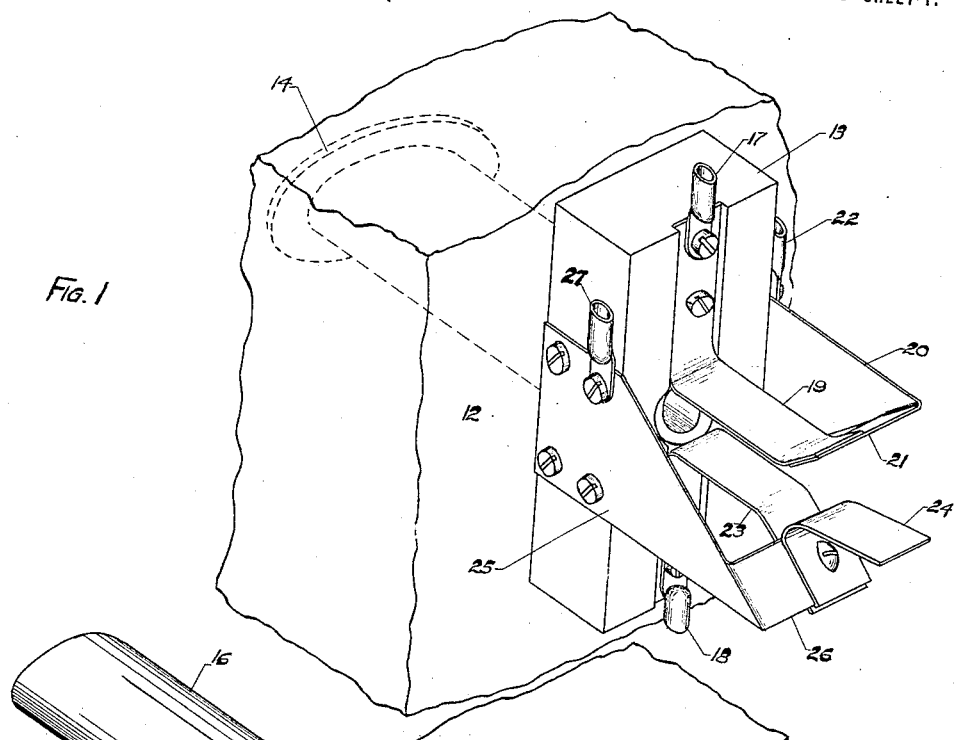
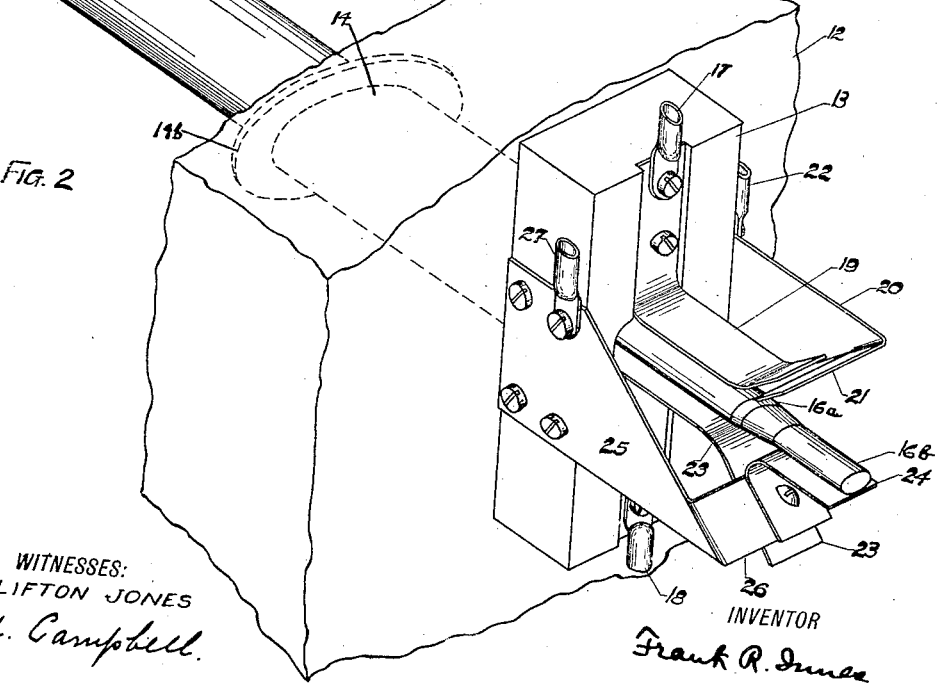
WITNESSES:
CLIFTON JONES
M. Campbell.
INVENTOR
Frank R. Innes
BY
William M. Swan
ATTORNEY

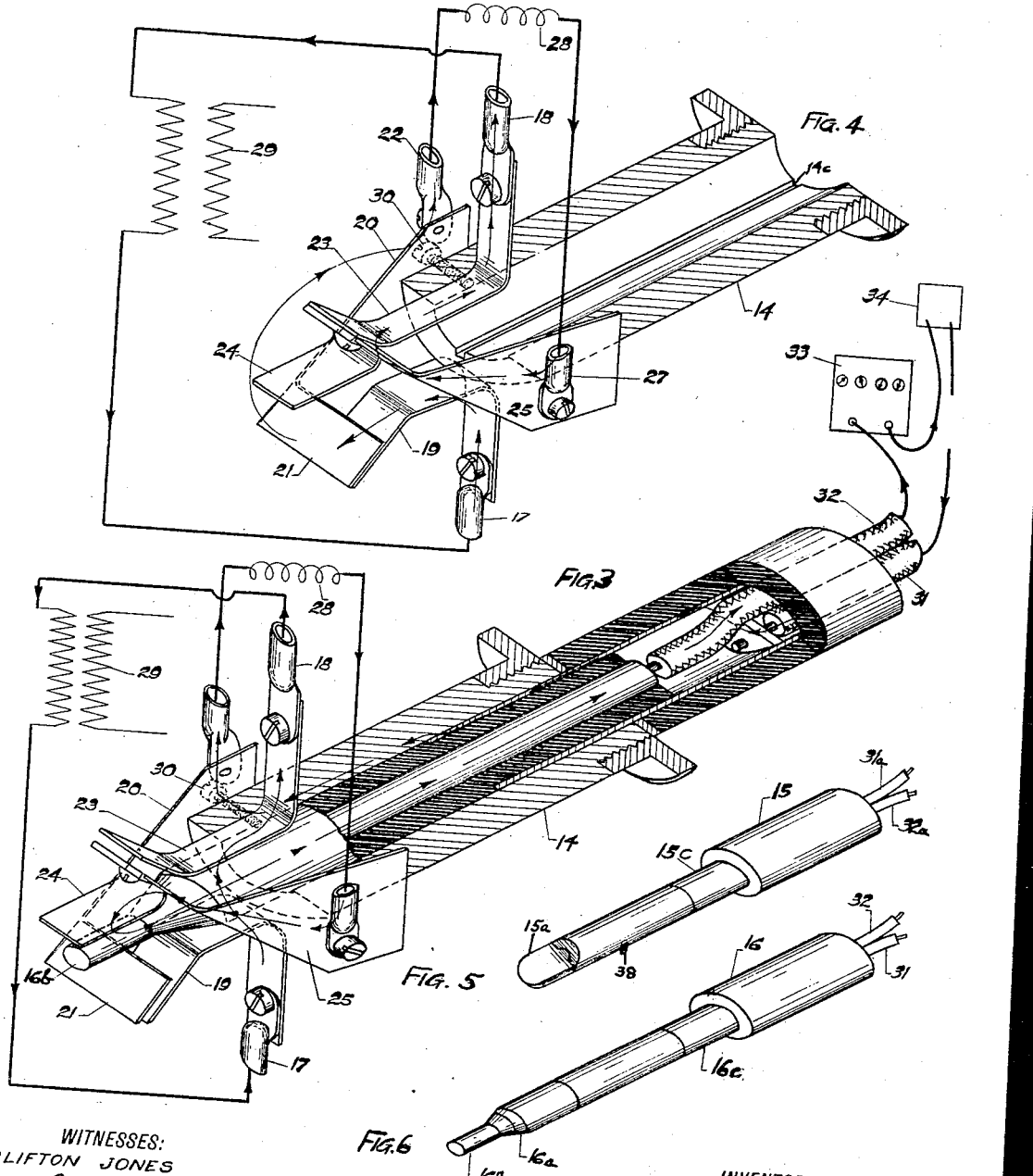

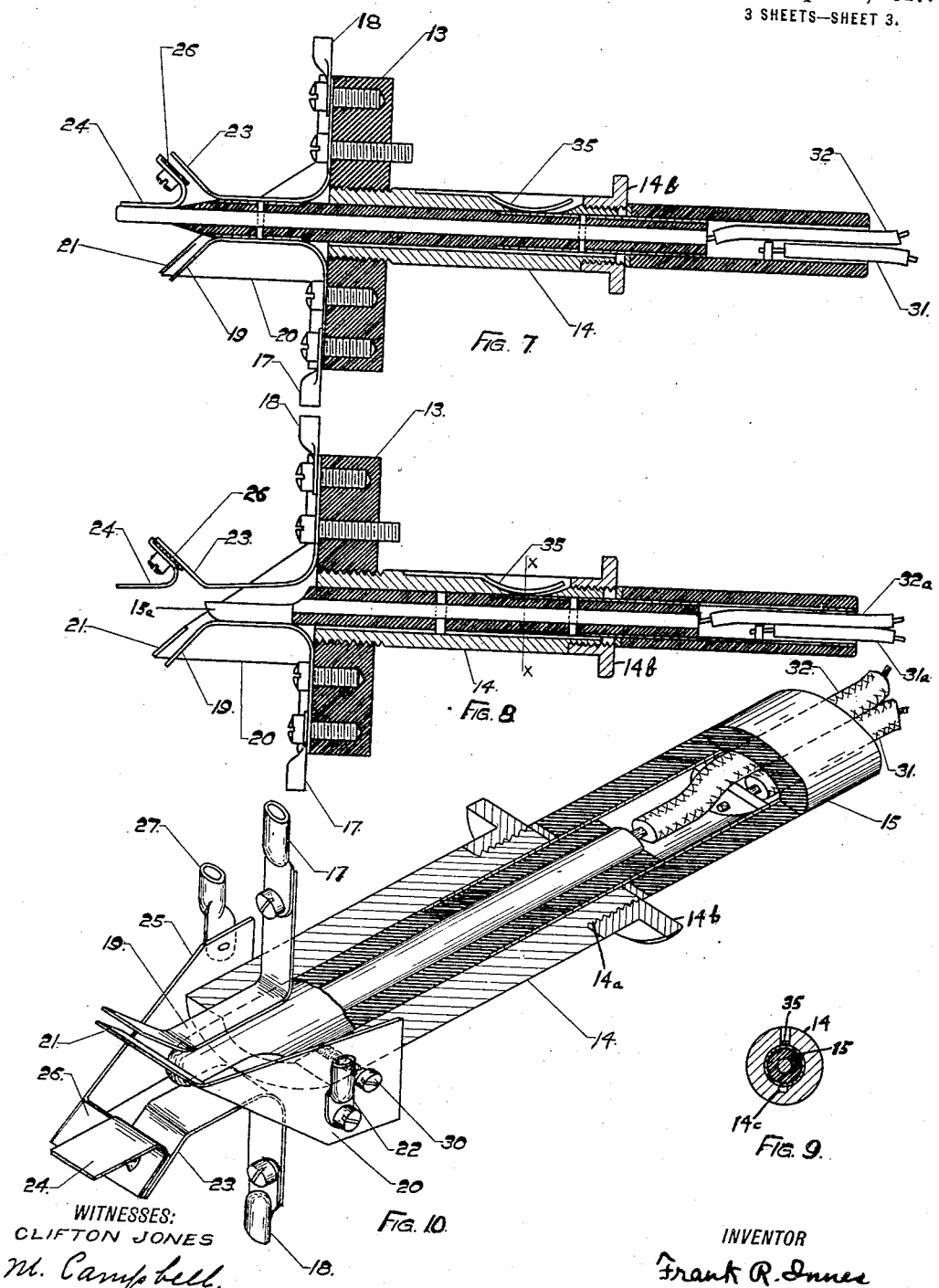

UNITED STATES PATENT OFFICE.

FRANK R. INNES, OF DETROIT, MICHIGAN.

CURRENT-JACK FOR ELECTRICAL METERS.

1,240,574.  Specification of Letters Patent.  Patented Sept. 18, 1917.

Application filed September 18, 1915. Serial No. 51,478.

*To all whom it may concern:*

Be it known that I, FRANK R. INNES, a citizen of the United States, residing at Detroit, county of Wayne, State of Michigan, have invented a certain new and useful Improvement in Current-Jacks for Electrical Meters, and declare the following to be a full, clear, and exact description of the same, such as will enable others skilled in the art to which it pertains to make and use the same, reference being had to the accompanying drawings, which form a part of this specification.

This invention relates to testing jacks for electrical meters, and has for its object an improved construction whereby either an artificial load test or an operating load test may be made, either one without interrupting the current furnished to customers, and by the insertion, for contact with the terminals desired, of a selected meter plug terminal; in either case no disconnection of the regular service parts is necessary. The device is of particular utility in connection with current transformers, in that it provides means for inserting testing apparatus in their secondary circuits, and also permits their being handled beyond the point at which the jack is inserted for any changes of connection in these secondary circuits, without danger to the operator and without danger of injuring the transformer itself.

In the drawings:—

Figure 1 is a perspective of the jack mounted upon a fragmentary section of insulating material, such as the panel of a switch-board.

Fig. 2 is a similar perspective of the apparatus, with a test plug interposed between its terminals.

Fig. 3 is a diagrammatic perspective, partly in section, with the same plug as is shown in Fig. 2 inserted for contact with the terminals of the jack.

Fig. 4 is a diagrammatic perspective, partly in section, of the construction shown in Fig. 1, though with the leaf clips in inverted positions from the showing in Fig. 1.

Fig. 5 is a perspective of the plug used to make the connections desired for a normal load test.

Fig. 6 is a perspective of the plug used to make the connections for an artificial load test.

Fig. 7 is a longitudinal section of the apparatus, with the plug shown in Fig. 6 inserted for the artificial load test.

Fig. 8 is a longitudinal sectional elevation of the device, with the plug used for a normal load test inserted.

Fig. 9 is a section through the device with one of the plugs in place, along the line $x$—$x$ of Fig. 8.

Fig. 10 is a perspective of the opposite side of the device from that shown in Figs. 1 and 2, designed to show the grounding screw 30 in particular.

The insulating block 13, which is mounted upon the wall or other support 12, is pierced for the engagement, through from the front or exposed face, of the brass tube 14, through which either the normal load plug 15, or the artificial load plug 16, is adapted to be inserted. Mounted on the insulating panel, above and below the point of entrance of the plugs, are the terminals 17 and 18 leading to the normal load or customer's circuit, and more particularly, to the secondary coil of the current transformer. One of these terminals 17 ends in a resilient clip 19, which, when neither plug has been inserted, engages with the projecting lip 21 of the bracket 20, which is also mounted upon the insulating block 13, and is connected with the end 22 of the meter coil 28.

Similarly the other one 18 of these circuit terminals ends in a leaf spring 23, whose tip engages the projecting tongue 26 of the bracket 25, which is mounted upon the insulating panel 13, similarly to the bracket 20, and which is connected at 27 with the meter coil 28.

When neither one of the test plugs is in place, the opposite leaf clip 19 is in contact with the projecting lip 21 of the bracket 20,—this being brought out especially clearly in Figs. 1 and 4. The course of the current is at that time through the meter coil 28, thence to the bracket 25, through its connection 18 with the customer's circuit 29; thence through the terminal 17, the lip 21, and the bracket 20, to the other branch of the meter circuit 28.

When, however, an artificial load test is desired, the plug 16 is inserted in the tube 14, and its shouldered portion $16^a$, engaging against the leaf clips 19 and 23, disengages them from their respective contact lips 21 and 26, thereby short-circuiting the clips 19 and 23, while the tapered tip $16^b$ of the plug engages the leaf spring terminal 24. This plug being connected by means of the wires 31 and 32, respectively, with the test meter 33 and any source of outside current which may be applied to make the test, the course of the current now flowing through the meter coil circuit 28 is from the outside source, through the wire 31 to the outside sleeve 16$^c$ of the plug, thence to the tube 14, through the conductor screw 30 to the bracket 20, thence through the terminal 22, the meter coil 28, the terminal 27, the bracket 25, the leaf spring 24, to the tip 16$^b$ of the plug, thence to the wire 32 through the test meter 33 and through the loading medium 34 to the other side of the external source of current.

When, however, a normal load test is undertaken, the plug 15 is inserted. Unlike the plug 16, this is connected, by similar wires 31$^a$ and 32$^a$, directly to the test meter 33, without being connected with, or needing, any outside current source. Its forward and partially cut-away portion 15$^a$ engages the leaf clip 19 sufficiently to force it away from its normal position of contact with the lip 21 of the bracket 20. The engagement of the pin or stud 38 in the groove 14$^c$ of the tube 14 prevents the insertion of the terminal 15 in the tube and between the terminals except in such position as to cause the proper contact of its partly cut-away forward end 15$^a$ with the leaf clip 19. In this position of the parts the current flows through the terminal 17, thence to the stem of the plug, through the wires 31$^a$ and 32$^a$ and the test meter 33, thence through the sleeve 15$^c$ of the plug, through the brass tube 14, the conductor screw 30, the bracket 20, the terminal 22, to the meter coil 28, the terminal 27, the bracket 25 and leaf contact piece 26, the spring 23, the terminal 18 and back to the other side of the current transformer secondary or customer's load.

The conductor screw 30, besides its function as a conductor, acts also as a positive means of locking the tube 14 in the insulating block 13, thus insuring against any displacement of their desired relative positions.

The entire tube 14, which engages through the insulating block 13, may fit as tightly therein as desired, but in order to surely provide against its pulling out I have illustrated the preferred construction, in which the outer end 14$^a$ of the tube is screw-threaded and is engaged by a complementarily screw-threaded flanged collar 14$^b$, which engages against the outer face of the wall or panel 12 on which the insulating block 13 is mounted.

It is, of course, obvious that numerous departures from the exact construction and arrangement of parts here shown could be made without departure from the proper scope of my invention, which concerns broadly the safe, accurate, and non-interrupting observation of current conditions with which the customer is being furnished, with a minimum of delay and work in connecting up and in the amount of apparatus needed to be carried by the inspector from place to place.

What I claim is:

1. In a testing jack for electrical circuits, the combination of a pair of separable terminal members forming parts of a normally closed load circuit, a second pair of terminal members connected to a meter circuit and normally in contact with said first mentioned terminal members, and a pair of plugs selectively adapted for separable contact with certain of each class of terminal members, whereby said first-named terminal members may be short circuited through said secondly named terminal members, or whereby the engagement between the constituent members of the two groups of terminal members may be rearranged to bring a connected test meter circuit into the path of travel of the current passing through the closed load circuit.

2. In a meter testing jack, in combination with a pair of separable terminal members constituting normally active parts of a main line circuit, a plurality of normally inactive auxiliary terminals having connection with the main line circuit, and variously functioned plug members adapted to engage certain of each class of terminals to break the normal contact of those of the first named group and to selectively effect their engagement with certain of the second named group of terminals, thereby in the one case effecting a short circuit therethrough, and in the other case effecting the inclusion of a test meter circuit in the main line circuit.

3. Meter testing apparatus, comprising a jack having a plurality of contact members, a pair of which normally form parts of a closed load circuit and others of which are adapted to be forced into contact with one or the other of said pair upon the insertion of a plug containing the terminals of a normally external test meter circuit or of a plug for short-circuiting said pair of contact members, thereby clearing the meter contacts therefrom.

4. In a meter testing jack, the combination of a pair of connectible main line contacts, and a plurality of auxiliary contacts selectively capable of coöperation with one or the other of said main line contacts to form new current paths, whereby upon the insertion of plugs of different types a normally external test-meter circuit may be included in the path traversed by the current, or whereby the main line contacts may be short-circuited and connected to the test meter circuit.

5. In a meter testing apparatus, in combination with a pair of terminal members normally forming parts of a closed load circuit, a plurality of normally inactive auxiliary terminal members, and plug terminal members adapted to selectively engage certain ones of each of said classes of terminals, one of such plug members effecting the separation of the members of said first pair and their regrouping with certain of the auxiliary terminal members for the inclusion of a normally external test meter circuit, and the other of such plug members being adapted to short-circuit said first-named terminal members, thereby connecting a normally external current source with certain of the terminal members.

6. In a meter testing apparatus, the combination of a pair of separable terminal members normally forming parts of a closed load circuit, a plurality of auxiliary and normally inactive terminal members, the members of each class being adapted to be selectively engaged by normally external plug members, one of which is connected with the terminals of a test meter whose inclusion in the load circuit is effected by the selective regrouping of the terminal members due to their engagement by the plug member, and the other of which is adapted to short-circuit said pair of separable terminal members, and to accomplish the inclusion in the meter circuit of a normally external current source through certain of said auxiliary terminals.

7. A meter testing jack, having in combination with a pair of main line terminal members, a pair of plugs either of which is adapted to alter the circuit through said main line terminal members when interposed therebetween, and a plurality of normally inactive auxiliary terminal members against certain of which one or the other of said main line terminal members is adapted to be forced by the engagement of one of said plugs, whereby in the one case a test meter circuit with which the plug is connected is brought into circuit with the main line, and whereby in the other case said main line terminal members are short-circuited by contact with certain others of said auxiliary terminal members.

In testimony whereof, I sign this specification in the presence of two witnesses.

FRANK R. INNES.

Witnesses:
JEFFERSON G. THURBER,
WILLIAM M. SWAN.

Copies of this patent may be obtained for five cents each, by addressing the "Commissioner of Patents, Washington, D. C."